Patented Apr. 25, 1950

2,505,431

UNITED STATES PATENT OFFICE 2,505,431

SILICON OXIDE RESINS AND PROCESS OF MAKING SAME

John B. Rust, West Orange, and Homer van B. Joy, Montclair, N. J., assignors, by direct and mesne assignments, of one-half to Montclair Research Corporation, a corporation of New Jersey, and one-half to Ellis-Foster Company, a corporation of New Jersey No Drawing. Application June 20, 1944, Serial No. 541,294

10 Claims. (Cl. 260—46.5)

The present invention relates to silicon containing resinous compositions and methods of making the same including organic silicon derivatives containing hydrocarbon groups such as aliphatic, carbocyclic and alicyclic groups, and their conversion into resinous materials, to the methods of making such materials, and compositions containing the same.

Methyl silicon oxides, ethyl silicon oxides, phenyl silicon oxides, benzyl silicon oxides and so-called methyl aryl silicones have been described. These resins usually are made by the well-known reaction of silicon tetrachloride with an alkyl or aryl magnesium halide. However, many organo metallic compounds will react with silicon tetrahalides or alkyl orthosilicates to produce alkyl or aryl silicon halides or esters. These halides or esters are then hydrolyzed with water and the resulting alkyl or aryl silicon hydroxides are dehydrated by any suitable means to yield polymeric alkyl or aryl silicon oxides.

Among the objects of the present invention is the production of organic silicon derivatives and resinous materials produced therefrom by new and simple methods.

Further objects include the production of new types of such silicon derivatives and products and compositions containing the same.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

This application is a continuation-in-part of an application in the names of John B. Rust and Homer van B. Joy, Serial No. 469,542, filed December 19, 1942, entitled Disilicon oxide resins and process of making same, now abandoned, and is a substitute for that application.

In accordance with the present invention, it has been found that silicon oxychloride may be alkylated, arylated, aralkylated, or otherwise treated to introduce organic groups to produce new products and to yield resins having greater strength than prior art products. The resins thus produced are different from the resinous materials here-to-fore produced in the art, they are easier to cast, and the preferred compositions cure at low temperature. Because of the properties of these resinous materials, and notably their resistance to water, it appears that the silicon oxychloride is the active agent, and that there is a direct bond between the silicon atoms and the organic radicals.

As the silicon oxychloride there is preferably utilized the compound $Si_2OCl_6$, having the boiling point 137° C. It is not necessary to utilize the pure silicon oxychloride, but the by-product containing the same which is formed in the commercial production of silicon tetrachloride and is a mixture containing such silicon oxychloride together with other derivatives including silicon chlorides, such as disilicon hexachloride together with oxygenated products, may be employed. Further while the particular silicon oxychloride $Si_2OCl_6$ is preferred, other silicon oxychlorides can be utilized. Furthermore, mixtures of the silicon oxychloride together with silicon halides such as silicon tetrahalide or disilicon hexahalide may be employed in producing copolymers.

As the hydrocarbon substituents attached to the silicon there may be present alkyl, aryl, olefinyl, alkenyl, alkynyl, arenyl, arynyl, aralkyl, alkaryl, alicyclic, cyclic non-aromatic, etc. groups, as illustrated for example by methyl, ethyl, propyl, butyl, amyl, hexyl, heptyl, octyl, lauryl, isoamyl, isobutyl, isopropyl, cetyl, vinyl, allyl, butenyl, the radicals from acetylene, methyl acetylene, propyl acetylene, phenyl, tolyl, xenyl, xylyl, naphthyl, chlorphenyl, styryl, and radicals from such derivatives as phenyl acetylene, etc. These organic radicals may be attached to the silicon itself, or to other portions of the molecule. Mixed derivatives containing two or more of any of the various derivatives and organic radicals referred to above may also be produced. The term "arkyl" is used herein to cover alkyl and aryl groups.

As a probable explanation of the formation of the novel resins, it is believed that one or more of the halogen atoms of the silicon oxychloride is replaced by organic radicals from the organo magnesium halides or other reactants employed. Hydrolysis of these products probably forms silicols. Such silicols polymerize presumably by loss of water, forming oxygen links between the various silicols. This hypothesis satisfactorily explains the facts observed, but reference to such hypothesis and explanation is not intended to be limiting since other possibilities exist.

In producing the organic silicon derivatives in accordance with the present invention, various reactions may be employed, as for example, in the reaction of the silicon oxychloride either alone or in admixture as pointed out above, with an organo magnesium halide. Any reactive organo metalic compound can be utilized which will produce the desired reaction products such as those of zinc, lithium, etc. Reactions with Grignard type reagents such as the organo magnesium halides represent a desirable way of producing the products sought. Such reactions with Grignard type reagents may be carried out in two stages in which for example, the organo magnesium halide is first formed and then reacted with the silicon oxychloride or mixture containing the same, or the organo magnesium halide or related material may be produced in situ in the presence of the silicon oxychloride or mixture containing the same. In producing the Grignard type reagent in situ, the necessary components such as magnesium, alkyl halide with or without a catalyst, are reacted in situ in the presence of the silicon compound being treated. Grignard reaction solvents such as ether may or may not be present in such in situ reactions. The Grignard type reagents produced in situ may be those formed from magnesium, lithium, etc. In illustrating the invention as set forth below, the examples illustrate the production of the desired derivatives by utilizing an organo magnesium halide with the silicon oxychloride but these are illustrative only and the examples are not to be considered as limiting. The proportions in the following examples are given in parts by weight.

The products produced by the present processes are complex mixtures especially where no solvent is used during the reaction. It is possible that some Si-Si linkages are formed as well as C-Si linkages. However, again this is speculation and no limitation by way of theory is intended. However, in some cases the products of the present invention utilizing those reactions where the Grignard type reagent is prepared in situ, differs from those made by two step reactions in which the Grignard type reagent is formed separately.

The products of the invention may be hydrolyzed in water and by subsequent heating converted into hard, tough, plastic materials. On the other hand, the hydrolytic products may be dissolved in suitable solvents and used as baking lacquer materials, for impregnation of fillers, etc. Other uses will appear hereinafter.

*Example 1.*—31.2 parts of methyl iodide were reacted in ether solution with 4.86 parts of magnesium. This solution was added gradually with stirring to 22.4 parts of the commercial product obtained as a by-product in the manufacture of silicon tetrachloride, boiling mainly at 135–139° C., and containing substantial quantities of silicon oxychloride, this by-product being dissolved in ether. After addition had been completed, the mixture was refluxed 1½ hours, and then hydrolyzed by pouring it on cracked ice. It was next washed repeatedly with water to remove hydrochloric acid and magnesium salts. The ether was removed by evaporation, and the material was heated 18 hours at 40°–50° C. A hard, brittle resin was formed.

*Example 2.*—24 parts of ethyl bromide were reacted in ether solution with 4.86 parts of magnesium. This solution was added gradually with stirring to 26.9 parts of the silicon oxychloride by-product referred to in Example 1, in ether. After addition had been completed, the material was refluxed 2 hours. The mixture was hydrolyzed, washed, and concentrated as previously described. After 3 days heating at 40°–50° C. it cured to a hard, pale-yellow resin. This resin was much stronger than any of the known monosilicon resins from silicon tetrachloride. The resin was heated at 175° C. for 18 hours. It did not lose any of its strength and showed no change except a slight darkening in color.

*Example 3.*—30.1 parts of normal butyl bromide were reacted in ether solution with 4.86 parts of magnesium. This mixture was added gradually with stirring to 29.9 parts of the silicon oxychloride by-product used in Example 1, in ether. It was then hydrolyzed, washed, and concentrated as previously described. It was heated 10 days at 40° to 50° C. and then at 100° for 18 hours. A hard, brittle resin was formed. 18 hours heating at 175° failed to cause any apparent change.

*Example 4.*—34.5 parts of phenyl bromide were reacted in ether solution with 4.86 parts of magnesium. This mixture was added gradually with stirring to 26.9 parts of the silicon oxychloride by-product referred to in Example 1, and then refluxed 1½ hours. After hydrolyzing, washing, and concentrating it was heated at 40°–50° C. for 3 days and was still liquid. It was then heated 36 hours at 100° C. which cured it to a hard, brittle resin.

*Example 5.*—15.1 parts of normal butyl bromide were mixed with 15.6 parts of methyl iodide and reacted in ether solution with 4.86 parts of magnesium. This mixture was added gradually with stirring to 26.9 parts of the silicon oxychloride by-product referred to in Example 1, and refluxed 1½ hours. It was then hydrolyzed, washed, and concentrated as previously described and heated 18 hours at 40–50° C., at the end of which time it was fairly hard. It was heated 3 weeks longer at 40°–50° C., during which it gradually increased in strength. Nine Sward Rocker hardness readings on a film of this material gave an average of 57.

*Example 6.*—16.6 parts of normal amyl bromide were mixed with 15.6 parts of methyl iodide and reacted in ether solution with 4.86 parts of magnesium. This mixture was added gradually with stirring to 26.9 parts of the silicon oxychloride by-product used in Example 1, and refluxed 1½ hours. After the usual hydrolysis, washing and concentration, it was heated at 40°–50° C. for 18 hours. It was fairly hard at this time but did not have much strength. Further heating at the same temperature for 3 weeks greatly increased the strength.

*Example 7.*—15.1 parts of normal butyl bromide were mixed with 16.6 parts of normal amyl bromide and reacted in ether solution with 4.86 parts of magnesium. This mixture was added gradually with stirring to 29.9 parts of the silicon oxychloride by-product referred to in Example 1, and refluxed 1½ hours. It was then hydrolyzed, washed, and concentrated as previously described. It was cured to a hard resin by 5 days heating at 40°–50° C.

*Example 8.*—An ether solution of a silicon oxychloride reaction product was prepared as described from 24.0 parts of ethyl bromide, 4.86 parts of magnesium and 24.5 parts of the silicon oxychloride by-product referred to in Example 1. After hydrolysis and washing, 4 parts of asbestos floats were added and after evaporation of the ether, the mixture was molded for ½ hour at 160° C. under 320 pounds per square inch pressure. A hard, gray, well-shaped molding was formed.

*Example 9.*—24 parts of ethyl bromide were reacted in ether solution with 4.86 parts of magnesium. This solution was added gradually with stirring to 11.2 parts of the silicon oxychloride by-product referred to in Example 1, and 13.1 parts of silicon tetrachloride in ether and then refluxed 1½ hours. The material was hydrolyzed, washed and concentrated as previously described and was heated 4 days at 40°–50° C. It cured to a hard, pale-yellow resin.

Example 10.—12.5 parts of methyl iodide were mixed with 5.5 parts of normal lauryl bromide and reacted in ether solution with 2.43 parts of magnesium in ether solution. This solution was added gradually with stirring to 13.5 parts of the silicon oxychloride by-product referred to in Example 1, in ether and refluxed 2 hours. The product was hydrolyzed, washed, and concentrated as previously described. It was then heated 18 hours at 40°–50° C. and then at 120° C. for 20 hours. A rubbery resinous material was formed.

These novel silicon oxide polymers have thermal stability greater than the usual coating and bonding agents. They may be used as such coating and bonding agents, for example, by applying to the desired materials after solution in suitable solvents such as hydrocarbon solvents both aliphatic and aromatic, such as benzene, xylene, toluene, and other aromatic hydrocarbons, ethers such as dimethyl ether, etc., alcohols such as butanol, esters such as ethyl acetate, etc. In such solution they may be used for application as coating compositions or as bonding agents for fillers, or the polymers may be polymerized further in situ in such compositions. The solutions, etc. are thus useful as protective and decorative coatings. The solvent may be added to the reaction mixture before it is poured on ice to hydrolyze it.

While the reaction products have been particularly utilized as illustrated above in the production of hydrolyzed products followed by dehydration, other types of resinous materials may be obtained, as for example, by adding a moist alcohol to the reaction products before pouring them on ice. In such instances, the alkoxy or related group partially replaces other substituents on the silicon. Moist ethanol may thus be employed as well as other moist alcohols individually or in admixture, such as the aliphatic alcohols including methanol, propanol, butanol, phenols such as phenol, cyclic non-aromatic or alicyclic alcohols such as cyclohexanol, and the like. Anhydrous alcohols, etc. may also be used and the products converted into the silicon alkoxy, aryloxy, or related derivatives.

A variety of other utilities are available for these various reaction products. Thus sheet insulation may be prepared by treating woven or felted organic or inorganic fabrics such as paper or glass, etc., with solutions of these silicon polymers. Flaky inorganic materials such as mica may be employed in lieu of the fabrics.

The hydrolyzed or partially hydrolyzed or etherified materials may be used as lacquers or adhesives, either alone, or in admixture with other completely reacted or potentially reactive resins. Similarly molding compositions may be prepared from such combinations. Among the resins which may be mentioned in this connection for inclusion are natural resins such as rosin, copal, shellac, etc., as well as synthetic resins including urea aldehyde resins, phenol aldehyde resins, melamine resins, alkyd resins, aniline aldehyde resins, acetone formaldehyde resins, cumarone resins, polymerized vinyl derivatives and vinyl resins, polymerized acrylic derivatives including the esters of acrylic and methacrylic acids, etc.

The polymers of the present invention may be compounded with cellulose derivatives, particularly cellulose esters and ethers such as cellulose acetate, cellulose nitrate, ethyl cellulose, benzyl cellulose, etc. In some cases the hard, brittle polymers that may be produced in accordance with the present invention may be powdered and used as fillers for the various compounding ingredients as set forth above. In cases where these silicon resinous polymers of the present invention are compatible with the substances with which they are to be incorporated, they may be in the form of a liquid or soft polymer of relatively low molecular weight. The hard, brittle polymers produced in accordance with the present invention may be plasticized by the addition of suitable plasticizing agents or by silicon or disilicon oxide resins of lower softening point.

The low molecular weight polymers may be dissolved or dispersed in oils such as tung oil, linseed oil, etc., alone or mixed with pigments, plasticizers and driers to form coating compositions or coating compositions of the lacquer type produced from cellulose derivatives as set forth above with these silicon polymers together with solvents may be utilized.

Laminated products may be made by superimposing organic or inorganic fibrous sheet materials coated and impregnated with the resins of this invention, and subsequently bonding the sheets together under heat and pressure.

The silicon derivatives either alone or in admixture with other additives including resins as set forth above, may be mixed with various inorganic or organic fillers and used for hot molding, extruding, casting, etc. Objects having excellent strength and high resistance to water and organic solvents may thus be produced. The inorganic fillers include both fibrous and non-fibrous materials, such as the clays like bentonite, mica, asbestos, glass, cellulosic materials such as paper, cotton, wood flour, etc.

The silicon derivatives of the present invention as illustrated above may be used as textile finishing compositions either alone or in solution in solvents to produce special effects in or on such textiles.

The silicon derivatives prepared in accordance with the present invention may be used as lubricating oils or may be used as additives to both hydrocarbon oils such as lubricating oils as well as for the inclusion with vegetable oils such as the drying oils as illustrated above, and also with semi-drying oils such as soya bean oil, as well as non-drying oils including castor oil, etc. They may be blended with such oils by cooking or other operations.

Having thus set forth our invention, we claim:

1. In the process of making resinous products, the step of replacing chlorine in silicon oxychloride with a hydrocarbon group by reacting silicon oxychloride $Si_2OCl_6$ with an organo magnesium halide reactive therewith, the organo group being alkyl of from 1 to 16 carbon atoms, the proportions of oxychloride to organo magnesium halide being about 1:1.9 to 1:2.6 moles giving a reaction product containing organo groups attached to silicon and also containing hydrolyzable chlorine attached to silicon.

2. The process of making resinous products which comprises replacing chlorine in silicon oxychloride with a hydrocarbon group by reacting silicon oxychloride $Si_2OCl_6$ with an organo magnesium halide reactive therewith, the organo group being alkyl of from 1 to 16 carbon atoms, the proportions of oxychloride to organo magnesium halide being about 1:1.9 to 1:2.6 moles giving a reaction product containing organo groups attached to silicon and also containing hydrolyzable chlorine attached to silicon, hydrolyzing said hydrolyzable chlorine and dehydrating the resulting product.

3. The process as set forth in claim 1 in which the alkyl group is methyl.

4. The process as set forth in claim 1 in which the alkyl group is ethyl.

5. The process as set forth in claim 1 in which the alkyl group is n-butyl.

6. The reaction product of silicon oxychloride $Si_2OCl_6$ with a Grignard reagent having the formula RMgX where R is alkyl of from 1 to 16 carbon atoms and X is halogen and the ratio of oxychloride to Grignard reagent of about 1:1.9 to 1:2.6 moles, the reaction product containing organo groups of the Grignard reagent attached to silicon and also containing hydrolyzable chlorine attached to silicon.

7. A resinous product comprising the dehydrated material from the chlorine only-hydrolyzed reaction product of silicon oxychloride $Si_2OCl_6$ with an organo magnesium halide in the ratio of about 1:1.9 to 1:2.6 moles, the organo group being alkyl of from 1 to 16 carbon atoms, the reaction product containing organo groups of the organo magnesium halide attached to silicon and also containing hydrolyzable chlorine attached to silicon.

8. A reaction product as set forth in claim 6 in which the alkyl group is methyl.

9. A reaction product as set forth in claim 6 in which the alkyl group is ethyl.

10. A reaction product as set forth in claim 6 in which the alkyl group is n-butyl.

JOHN B. RUST.
HOMER van B. JOY.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,222 | Rochow | Oct. 7, 1941 |
| 2,381,366 | Patnode | Aug. 7, 1945 |

FOREIGN PATENTS

| Number | Country | Date |
|---|---|---|
| 113,708 | Australia | Sept. 4, 1941 |

OTHER REFERENCES

Kipping, Proc. Royal Soc. (London), vol. A 159, 1937, pp. 139–142–145.

Schumb et al., J. Amer. Chem. Soc., vol. 61, pp. 363–366 (1939), Chemical Abstracts, vol. 33, p. 4590 (1939).

Ephraim, Inorganic Chemistry, 4th Ed., 1943, pp. 811, 832–834.

Sauer, J. Chemical Education, vol. 21, June 1944, pp. 303–305.

Fieser et al., Organic Chemistry Heath 1944, p. 154.

Emeleus et al., Journ. of the Chem. Soc. (London), Dec. 1947, pp. 1590–1592.